Patented Jan. 15, 1924.

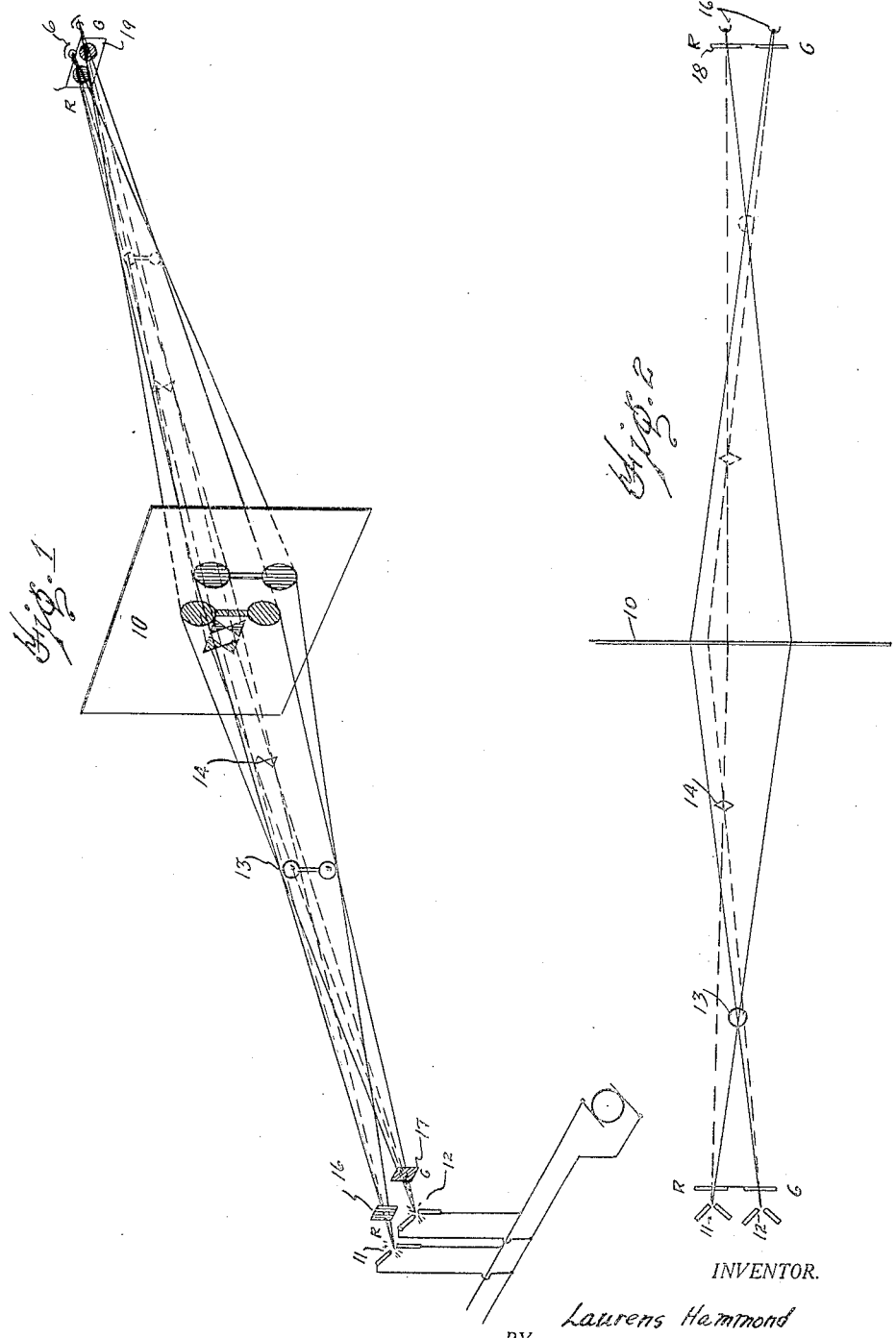

1,481,006

UNITED STATES PATENT OFFICE.

LAURENS HAMMOND, OF NEW YORK, N. Y.

PROCESS OF AND APPARATUS FOR STEREOSCOPIC SHADOWGRAPHS.

Application filed January 23, 1923. Serial No. 614,354.

*To all whom it may concern:*

Be it known that I, LAURENS HAMMOND, a citizen of the United States, residing at New York, county of New York, State of New York, have invented a certain new and useful Improvement in Processes of and Apparatus for Stereoscopic Shadowgraphs, and declare the following to be a full, clear, and exact description of the same, such as will enable others skilled in the art to which it pertains to make and use the same, reference being had to the accompanying drawings, which form a part of this specification.

My invention relates to the process of and apparatus for exhibiting stereoscopic shadows or silhouettes. The object is to exhibit, in stereoscopic relief, to an observer shadows or silhouettes of actual objects such as scenery or living characters, and particularly to exhibit to an audience shadows of actual objects in such a manner that each member of the audience will view the silhouettes of the objects stereoscopically.

Further, an object is to exhibit to an audience stereoscopic shadows of actual objects such as actors and scenic property after such a fashion that the audience will apparently see the objects as located and moving about in the hall over the heads of the audience and in advance of the stage on which they are actually located and in advance of the screen on which their shadows are thrown, and to provide apparatus for accomplishing the above purpose.

Another feature of prime importance is the exhibition of silhouettes of moving objects in stereoscopic relief, which silhouettes appear to advance toward and recede from the observer moving through space in advance of the curtain upon which the shadows are actually thrown and approaching toward the observer and receding therefrom as the dimensions of the shadows on the curtain increase and diminish.

I accomplish the above purpose by causing light to fall upon the same common object from two separated points to produce on a suitable viewing screen two shadows of the same object, which shadows differ from one another as the right eye view and the left eye view of a stereoscopic picture differ from each other.

The above and other objects and the working out of the process and the construction and operation of the apparatus employed will more fully appear from the following description, appended claims and accompanying drawings illustrating apparatus for accomplishing the results desired; in which:

Figure 1 is a diagrammatic perspective.

Fig. 2 is a diagrammatic plan of simple apparatus suitable for accomplishing the objects of my invention.

In the drawings, 10 indicates a viewing screen which in theatre practice may well be a translucent fabric screen such as cotton curtain fabric stretched over a suitable supporting frame. This screen in the ordinary theatre is positioned forwardly on the stage and back stage is positioned apparatus for emitting light rays from two different points, in this case said light emanates from two electric arcs 11 and 12. These lights are disposed side by side at an interval which I prefer to be the interpupillary interval, to-wit, approximately two and one-half inches, and so as to throw their rays upon the screen 10. The objects positioned between the screen and the lights such as 13 and 14, will cast double shadows of themselves upon the screen. These shadows will be somewhat larger than the actual objects depending upon the relative proximity of the actual objects to the lights. Each object will cast two shadows, one from each light. These shadows will not superimpose on the screen but are slightly separated from each other. The two outlines of any irregular solid object thrown upon the screen by the two lights will vary from each other upon the screen as left and right eye views of a stereoscopic picture vary from each other, and may be termed stereoscopic left and right eye shadows.

An observer in the audience positioned on the opposite side of the screen such as 15 will see the screen and the shadows thrown thereon of the objects 13 and 14. In viewing the screen with the naked eye the observer will see the two shadows above described. In order, however, to enable the observer to see these shadows stereoscopically, it is necessary to provide a device to assist in fusing the two shadows into one stereoscopic apparition. Different types of stereoscopic apparatus may be employed for this purpose.

In Figs. 1 and 2 I make use of the color filter principle, which is well known in stereoscopic work.

The rays of light from light 11 may be filtered through a red colored screen 16. The rays of light from light 12 may be filtered through a green filter screen 17. Obviously other colors might be employed. The spectator in this case is provided with glasses having red and green filters in front of the two eyes, in this case a red filter in front of the right eye and a green filter in front of the left eye.

Viewing the shadows on the screen through the provided spectacles the spectator now sees with the right eye through the red filter the shadow of an object such as 13 which is produced by the light 11 as filtered through the red screen 16, and with the left eye through the green filter the shadow of the same object which is produced by the light 12 as filtered through the green screen 17. The shadow produced by the light 11, the rays of which are filtered through the red screen, will not be visible to the spectator's left eye which sees through the green filter, and the shadow produced by the light 12, the rays of which are filtered through the green screen, will not be visible to the spectator's right eye which sees through the red filter. This theory of light filtering is well known and need not be further described to understand the working of this process. It will be seen, however, that the right eye will see one shadow and the left eye the other shadow but that both eyes looking at the same time will not see the same shadow but will see different shadows of the same object.

Referring again to the drawings, the shadow on the screen of the object 13 is enlarged to a greater extent than the shadow of the object 14, as object 13 is closer to the source of illumination and further from the screen, to an observer seated in the audience, the stereoscopic shadow of the object 13 will appear to be considerably in advance of the stereoscopic shadow of the object 14. An observer looking at the screen will see the screen itself and will apparently see solid objects in between the screen and himself. As a real object on the stage moves from the screen toward the source of light, the observer will see the phantom object corresponding to the actual object move from the screen toward himself through space in the hall. The size of the shadow of the object on the screen will increase as the object moves from the screen toward the light but in the eyes of the observer such shadow will apparently remain approximately the same size throughout its movement and will appear to move toward the observer as it increases in size on the screen. The reverse of the above is also true.

What I claim is:

1. The process of exhibiting to an observer a stereoscopic shadowgraph of an actual object which consists in throwing on a screen by means of light emanating from two sources two different shadows of the same object, and providing means whereby the observer may see one shadow only with the right eye and the other shadow only with the left eye.

2. The process of exhibiting to an observer a stereoscopic shadowgraph of an actual object which consists in throwing on a translucent screen from two sources of illumination a right eye shadow and a left eye shadow of the same object, and providing means through which an observer may view such shadows adapted to obstruct the sight of the observer in such a manner that the right eye does not see the left eye shadow and the left eye does not see the right eye shadow.

3. The process of exhibiting to an observer stereoscopic silhouettes of a moving object which consists in projecting on a suitable screen two shadows of the object in such a manner that the shadows increase and decrease in size on the screen, and providing means through which the observer may view the projected shadows adapted to obstruct the sight of the observer so that one eye sees one shadow only and the other eye sees the other shadow only.

4. The process of exhibiting to an observer a stereoscopic silhouette of an actual object so that the silhouette appears to approach toward and recede from the observer, by projecting on a viewing screen by means of light emitted from two points a right eye shadow and a left eye shadow of the same object and by movement of the shadow producing apparatus causing the shadows to increase and decrease in dimension on the screen, and providing means to obstruct the sight of the observer so that each eye sees a different shadow of the same object.

5. The process of exhibiting to an observer a stereoscopic silhouette of an object, which consists in projecting upon a viewing screen by means of light emitted from two separated points a right eye shadow and a left eye shadow of the same object, the right eye shadow being produced by light filtered through a determined color filter, the left eye shadow being produced by light filtered through a different color filter, and providing a pair of spectacles through which the observer may view the shadows projected on the screen, which spectacles have correspondingly arranged color filters for the right eye and the left eye.

6. The process of exhibiting to an observer a stereoscopic shadowgraph, which consists in projecting a right eye shadow and a left eye shadow of the same object by means of light emitted from two points upon a viewing screen, the light producing such right and left eye shadows being projected through complementary color filters, and providing correspondingly arranged complementary color filters for the right eye and the left eye of the observer through which the observer may view the projected shadows on the screen.

7. The process of exhibiting to an observer a stereoscopic silhouette of an object, which consists in projecting on a viewing screen by means of light emitted from two points a right eye shadow and a left eye shadow of the same object, and by means of color filtration of the light on the object which produces the shadows and of the light entering the eyes of the observer causing the observer to see a shadow of the object in stereoscopic perspective.

8. The process of exhibiting to an observer a stereoscopic silhouette of a real object so that the silhouette appears to move toward and away from the observer, by projecting on a viewing screen a right eye shadow and a left eye shadow of the object in such a manner that the shadows increase and decrease in size on the screen, and by means of color filtration of the light on the object which produces the shadows and of the light entering the eyes of the observer causing the observer to see a shadow of the object in stereoscopic perspective which approaches toward the observer and recedes therefrom as the shadows of the object increase and decrease in size on the screen.

9. The process of exhibiting to an observer a stereoscopic silhouette of an object so that the silhouette appears to move toward and away from the observer by projecting on a viewing screen a right eye shadow and a left eye shadow of the object in movement so that the shadow of the object on the screen varies in size from time to time, and by means of color filtration of the light on the object which produces the right eye shadow and the left eye shadow and of the light entering the right eye and the left eye of the observer causing the observer to see a stereoscopic silhouette of the object.

10. In apparatus for exhibiting to an observer stereoscopic shadowgraphs, a screen, colored transparencies through which the observer views the screen, means for emitting light from two separated points to project two shadows of each object on the screen, and means for imparting a different color to the light emitted from each of the two separated points.

11. In apparatus for exhibiting stereoscopic shadowgraphs to an observer, means for emitting from each of two mutually separated points a differently colored light, a viewing screen, opaque objects between said lights and said screen, and two different and suitably colored transparencies through which an observer may view said screen with his right and left eye respectively.

12. In an apparatus for exhibiting to an observer stereoscopic shadowgraphs, means for emitting from each of two mutually separated points a different color of light, a viewing screen, objects moving toward and away from said points and casting shadows upon said screen, and two suitably differently colored transparencies through which an observer may view said screen with his right and left eye respectively.

13. In an apparatus for exhibiting a stereoscopic shadowgraph of an actual object to an observer, a viewing screen, an actual object, sources of illumination for projecting upon the screen a right eye shadow and a left eye shadow of the object, a suitable color filter through which the light producing the right eye shadow passes, a complementary color filter through which the light producing the left eye shadow passes, and correspondingly arranged color filters for the right eye and the left eye of the observer through which the shadows on the screen may be viewed.

14. In apparatus for exhibiting to an observer a stereoscopic shadowgraph of an actual object, a viewing screen, an actual object of which a shadowgraph is to be exhibited, two sources of illumination disposed to project a right eye shadow and a left eye shadow of the object upon the screen, suitable complementary color filters through which the light rays forming the shadows pass so that the right eye shadow is formed by light rays passing through one color filter and the left eye shadow is formed by light rays passing through the other color filter; and spectacles through which an observer may view the screen, the lens for the right eye comprising a color filter corresponding to the color filter for the light rays forming the right eye shadow and the lens for the left eye comprising a color filter corresponding to the color filter through which the light rays pass that form the left eye shadow.

15. In apparatus for exhibiting to an observer a stereoscopic silhouette of an actual object, a viewing screen, two mutually separated points of illumination, an object between the screen and the points of illumination, complementary color filters for such sources of illumination, a pair of correspondingly arranged complementary color filters positioned on the opposite side of the screen through which an observer may view the shadows of the object projected upon the screen.

16. In apparatus for exhibiting to an observer a stereoscopic shadowgraph of an actual object, a viewing screen, two mutually separated points of light, an object between the screen and the said points of light, suitably differently colored filters for said lights, suitably differently colored filters on the opposite side of the screen through which an observer may view the shadows projected thereon.

In testimony whereof, I sign this specification.

LAURENS HAMMOND.